United States Patent
Venketesan et al.

(10) Patent No.: US 11,831,788 B2
(45) Date of Patent: *Nov. 28, 2023

(54) SYSTEMS AND METHODS FOR SECURE ACCESS WITH HEARTBEAT MONITORING TO NATIVE CLOUD SERVICES TO COMPUTERS OUTSIDE THE CLOUD

(71) Applicant: DuploCloud, LLC, Fremont, CA (US)

(72) Inventors: Thiruvengadam Venketesan, Freemont, CA (US); Sukhjit Parihar, San Leandro, CA (US)

(73) Assignee: DUPLOCLOUD, INC., Fremont, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/231,803

(22) Filed: Apr. 15, 2021

(65) Prior Publication Data
US 2021/0234707 A1  Jul. 29, 2021

Related U.S. Application Data

(63) Continuation of application No. 16/175,804, filed on Oct. 30, 2018, now Pat. No. 10,985,927.

(60) Provisional application No. 62/578,773, filed on Oct. 30, 2017.

(51) Int. Cl.
| H04L 9/32 | (2006.01) |
| H04L 9/30 | (2006.01) |
| H04L 9/14 | (2006.01) |
| H04L 9/08 | (2006.01) |
| G06F 9/54 | (2006.01) |

(52) U.S. Cl.
CPC .......... H04L 9/3268 (2013.01); H04L 9/0819 (2013.01); H04L 9/14 (2013.01); H04L 9/3073 (2013.01); H04L 9/3226 (2013.01); G06F 9/547 (2013.01)

(58) Field of Classification Search
CPC ....... H04L 9/3268; H04L 9/0819; H04L 9/14; H04L 9/3073; G06F 9/547
USPC .......................................................... 713/156
See application file for complete search history.

(56) References Cited

U.S. PATENT DOCUMENTS

| 9,900,556 B1* | 2/2018 | Scanlon ................ H04M 3/567 |
| 10,064,055 B2 | 8/2018 | Raleigh et al. |
| 2003/0126464 A1 | 7/2003 | McDaniel |
| 2009/0025063 A1 | 1/2009 | Thomas |
| 2009/0190758 A1 | 7/2009 | Pourzandi |
| 2014/0282962 A1 | 9/2014 | Harrison |
| 2017/0005820 A1 | 1/2017 | Zimmerman |
| 2017/0063615 A1 | 3/2017 | Yang |

(Continued)

OTHER PUBLICATIONS http://docs.aws.amazon.com/AWSEC2/latest/UserGuide/using-network-security.html (retrieved on Nov. 5, 2018).

(Continued)

*Primary Examiner* — Bryan F Wright
(74) *Attorney, Agent, or Firm* — Nixon & Vanderhye, PC

(57) ABSTRACT

Certain example embodiments relate to systems and techniques for a client device outside of a cloud infrastructure to securely access services in the cloud infrastructure by relying on one or more keys that are validated by the cloud infrastructure based on a heartbeat message received from the client device. The heartbeat message may be secured by a certificate generated for the client device.

15 Claims, 7 Drawing Sheets

(56) References Cited

U.S. PATENT DOCUMENTS

2018/0203744 A1* 7/2018 Wiesmaier .............. G06F 9/505
2019/0075115 A1 3/2019 Anderson

OTHER PUBLICATIONS http://docs.aws.amazon.com/AWSEC2/latest/UserGuide/using-vpc.html (retrieved on Nov. 5, 2018).
http://docs.aws.amazon.com/IAM/latest/UserGuide/introduction.html (retrieved on Nov. 5, 2018).
http://docs.aws.amazon.com/AWSEC2/latest/UserGuide/concepts.html (retrieved on Nov. 5, 2018).
http://docs.aws.amazon.com/AWSEC2/latest/UserGuide/ec2-key-pairs.html (retrieved on Nov. 5, 2018).
http://docs.aws.amazon.com/iot/latest/developerguide/create-device-certificate.html (retrieved on Nov. 5, 2018).
http://docs.aws.amazon.com/iot/latest/developerguide/register-device.html (retrieved on Nov. 5, 2018).
http://docs.aws.amazon.com/iot/latest/developerguide/create-iot-policy.html (retrieved on Nov. 5, 2018).
http://docs.aws.amazon.com/iot/latest/developerguide/topics.html (retrieved on Nov. 5, 2018).
http://docs.aws.amazon.com/iot/latest/developerguide/iot-rules-tutorial.html (retrieved on Nov. 5, 2018).
https://boto3.readthedocs.io/en/latest/guide/quickstart.html (retrieved on Nov. 5, 2018).
https://www.wired.com/story/how-to-use-a-yubikey/ (retrieved on Nov. 5, 2018).

* cited by examiner

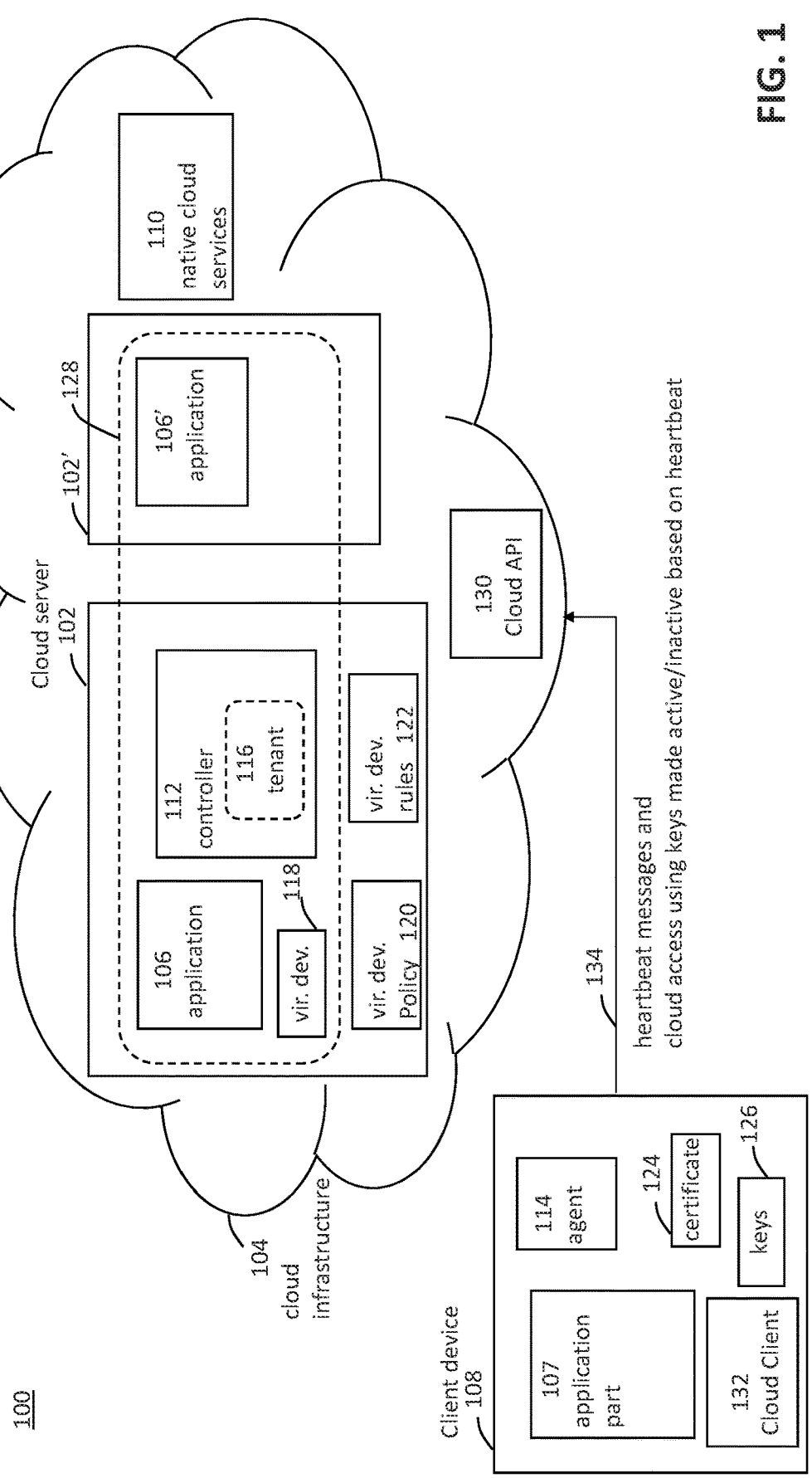

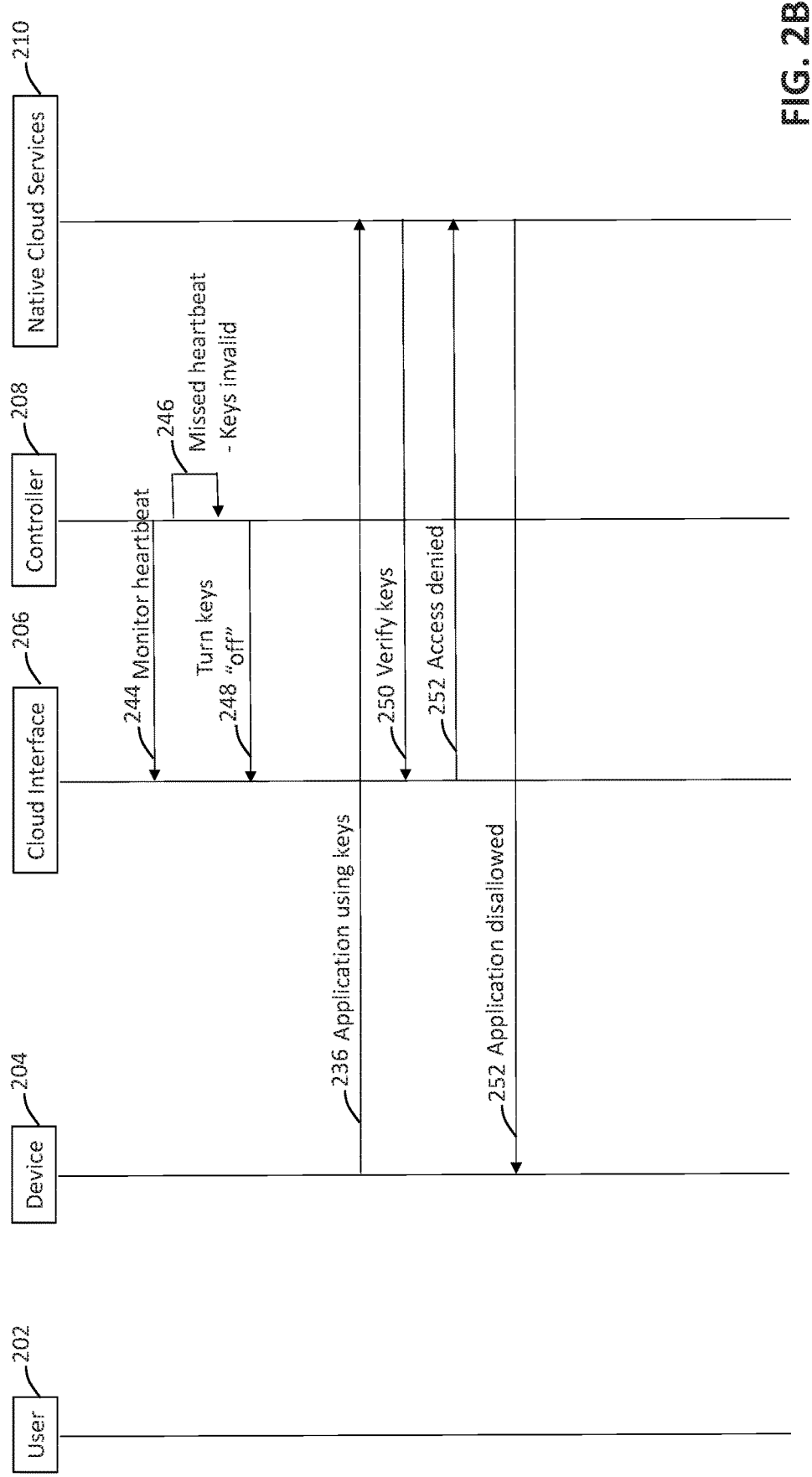

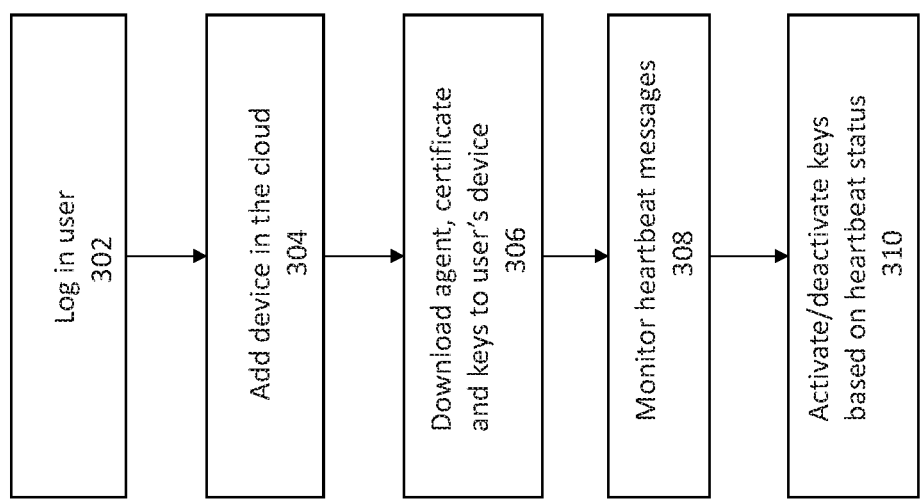

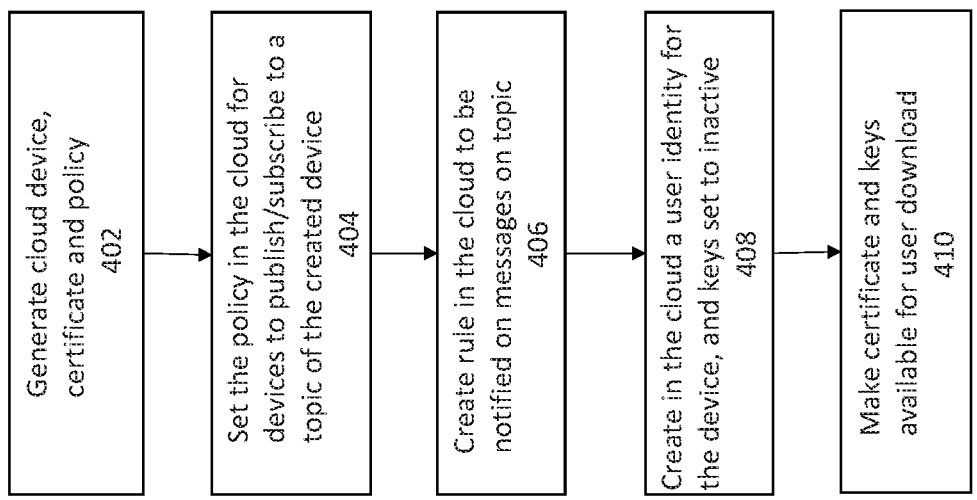

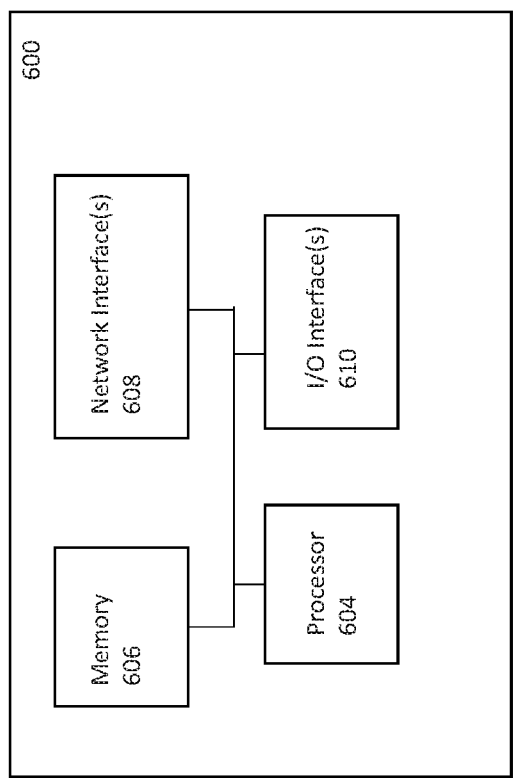

SYSTEMS AND METHODS FOR SECURE ACCESS WITH HEARTBEAT MONITORING TO NATIVE CLOUD SERVICES TO COMPUTERS OUTSIDE THE CLOUD

CROSS REFERENCE TO RELATED APPLICATIONS

This application is a continuation of U.S. patent application Ser. No. 16/175,804 filed Oct. 30, 2018, which claims the benefit of priority from U.S. Provisional Application No. 62/578,773 filed Oct. 30, 2017, the entire contents of which are incorporated herein by reference.

TECHNICAL FIELD

Certain example embodiments described herein relate to security in cloud computing environments, and more particularly to secure access to cloud native services from outside the cloud.

BACKGROUND

Cloud computing is now becoming pervasive. When operating according to a cloud computing model, a corporation would rely on an interconnected group of remote servers on the Internet for all or most of its data storage and processing needs. The cloud infrastructure, that is, the group of physical servers that hosts the storage and processing capabilities of the cloud and the associated networking, configuration and software, may be physically located in one or more datacenters that may be geographically distributed. Cloud infrastructure may be termed "private" or "public", with the former referring to cloud infrastructures that are dedicated to a single user or corporation (or a closed group of corporations) and the latter referring to cloud infrastructures that are open to any users or corporations. Amazon Web Service™ ("AWS") by AMAZON, Microsoft Azure™ by Microsoft, Google Cloud Platform™ by GOOGLE, and IBM Bluemix™ by IBM are examples of some currently available public cloud infrastructures. A cloud infrastructure may also be referred to simply as a "cloud".

With the data of many users and/or corporations being hosted on shared cloud infrastructure, public clouds in particular, must exercise strict security practices for access to the cloud. In a typical cloud deployment, users associated with a corporation (or equivalently, any type of organization) accesses that corporation's applications and resources through a web-based interface to servers that are hosted on the cloud. In this first type of use case, the interactions among processing applications and between applications and data storages etc. occur within the cloud. A second type of use case, however, is where an application or application part executing on a computer outside of the cloud requires access to some resources or applications that are in the cloud. For example, a software developer for a corporation may want to develop code for, and test, a portion of an application that requires communication with other applications and/or data hosted for that corporation on a cloud, and, for convenience, may want to execute the portion of the application on his/her laptop that is outside the cloud. The second type of use case may require that the application portion executing on the developer's laptop has access to all cloud resources of the corporation. Whereas in the first use case, username and password credentials for each user in the corporation may be sufficient to protect the corporation's cloud resources and other users of the cloud, the second use case requires additional techniques to secure the access to the cloud by an application running on a computer that is external to the cloud.

In order to access native cloud services from computers outside of cloud servers, some clouds, such as, for example, AWS, require users to create an access key pair and to use this key pair in applications running outside of the cloud datacenters. This approach as currently implemented, however, may not offer strong security because the generated keys have no expiry and are not tracked by the cloud in a manner that the cloud can detect and prevent misuse of the keys.

For computers outside AWS, besides user access keys, AWS provides another mechanism to use a set of key pairs that are temporary and called "STS keys". Together with a service called AWS Cognito™, an application can keep regenerating the keys. A drawback with this technique is that the keys not only expire but their values change as well. Moreover, this technique requires special code in the application to call an "STS server", generate new key pairs and use them. This needs to be done periodically, and results in different or extra code being inserted into applications.

If, on the other hand, the developer's computer executing the portion of the application was a server within the cloud infrastructure, then the cloud (e.g. AWS) may provide a mechanism such as what is referred to as an "IAM instance profile" where the server is labeled as part of a security domain without the use of keys. Since the server resides within the cloud this makes the server secure and at the same time no user access keys are required.

As the transition to cloud infrastructures continue increasing, some users, such as developers who want to test their application code by running the applications on their laptop or other computers, may increasingly require access to services in the cloud in a more convenient manner without significant additional overhead and/or effort as compared to when the user's computer is located in the cloud. Therefore, improved systems and techniques for accessing services within a cloud infrastructure from computers outside of that cloud infrastructure are desired.

SUMMARY OF EXAMPLE EMBODIMENTS OF THE INVENTION

Certain example embodiments described herein relate to systems and techniques that enable computers that are outside of a cloud to be able to efficiently use various cloud-based services.

An embodiment provides a method of securing access to a service in a cloud infrastructure from a client device outside of the cloud infrastructure. The method includes providing the client device with at least one key; monitoring heartbeat messages received from the client device; when the monitored heartbeat messages are detected to be consistent with a predetermined pattern, changing a state associated with a key assigned to the client device to a first state, and when the monitored heartbeat messages are detected to be inconsistent with the predetermined pattern, changing the state associated with the key to a second state; providing the client device access secured with the key to the service in the cloud infrastructure when the state corresponds to the first state; and preventing the client device from access secured with the key to the service in the cloud infrastructure when the state corresponds to the second state.

Another embodiment provides a system comprising a server in a cloud infrastructure, where the server is configured to perform operations including: providing the client device with at least one key; monitoring heartbeat messages received from a client device; when the monitored heartbeat messages are detected to be consistent with a predetermined pattern, changing a state associated with a key assigned to the client device to a first state, and when the monitored heartbeat messages are detected to be inconsistent with the predetermined pattern, changing the state associated with the key to a second state; providing the client device access secured with the key to the service in the cloud infrastructure when the state corresponds to the first state; and preventing the client device from access secured with the key to the service in the cloud infrastructure when the state corresponds to the second state.

Another embodiment provides a client device for securely accessing a service in a cloud infrastructure from a client device. The client device comprising at least one processor configured to perform operations comprising: receiving a certificate and a key pair which are assigned in the cloud infrastructure to the client device; transmitting heartbeat messages according to a predetermined pattern, each of the heartbeat messages being secured at least by the certificate; and providing for an application running on the client device to access the service in the cloud infrastructure using communication authenticated based on at least the key pair.

Another embodiment provides A non-transitory computer readable storage medium storing computer programming instructions that, when executed by at least one processor of a server in a cloud infrastructure, causes the server to provide, to a client device outside of the cloud infrastructure, secure access to a service in the cloud infrastructure, by performing operations comprising: providing the client device with at least one key; monitoring heartbeat messages received from the client device; when the monitored heartbeat messages are detected to be consistent with a predetermined pattern, changing a state associated with a key assigned to the client device to a first state, and when the monitored heartbeat messages are detected to be inconsistent with the predetermined pattern, changing the state associated with the key to a second state; providing the client device access secured with the key to the service in the cloud infrastructure when the state corresponds to the first state; and preventing the client device from access secured with the key to the service in the cloud infrastructure when the state corresponds to the second state.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a block diagram of a system for securely accessing native cloud services from outside the cloud, according to some example embodiments;

FIGS. 2A and 2B show a flowchart showing processes in the system of FIG. 1 for securely accessing native cloud services from outside the cloud, according to some example embodiments;

FIG. 3 is a flowchart of a process performed by a controller in the cloud for securely accessing native cloud services from outside the cloud, according to some example embodiments;

FIG. 4 is a flowchart of another process performing by the controller of FIG. 3 for providing secure access to native cloud services from outside the cloud, in accordance with some example embodiments;

FIG. 6 is a block diagram of an example computer platform which may be used in an implementation of the system shown in FIG. 1.

DETAILED DESCRIPTION OF EXAMPLE EMBODIMENTS

Figure 2A:
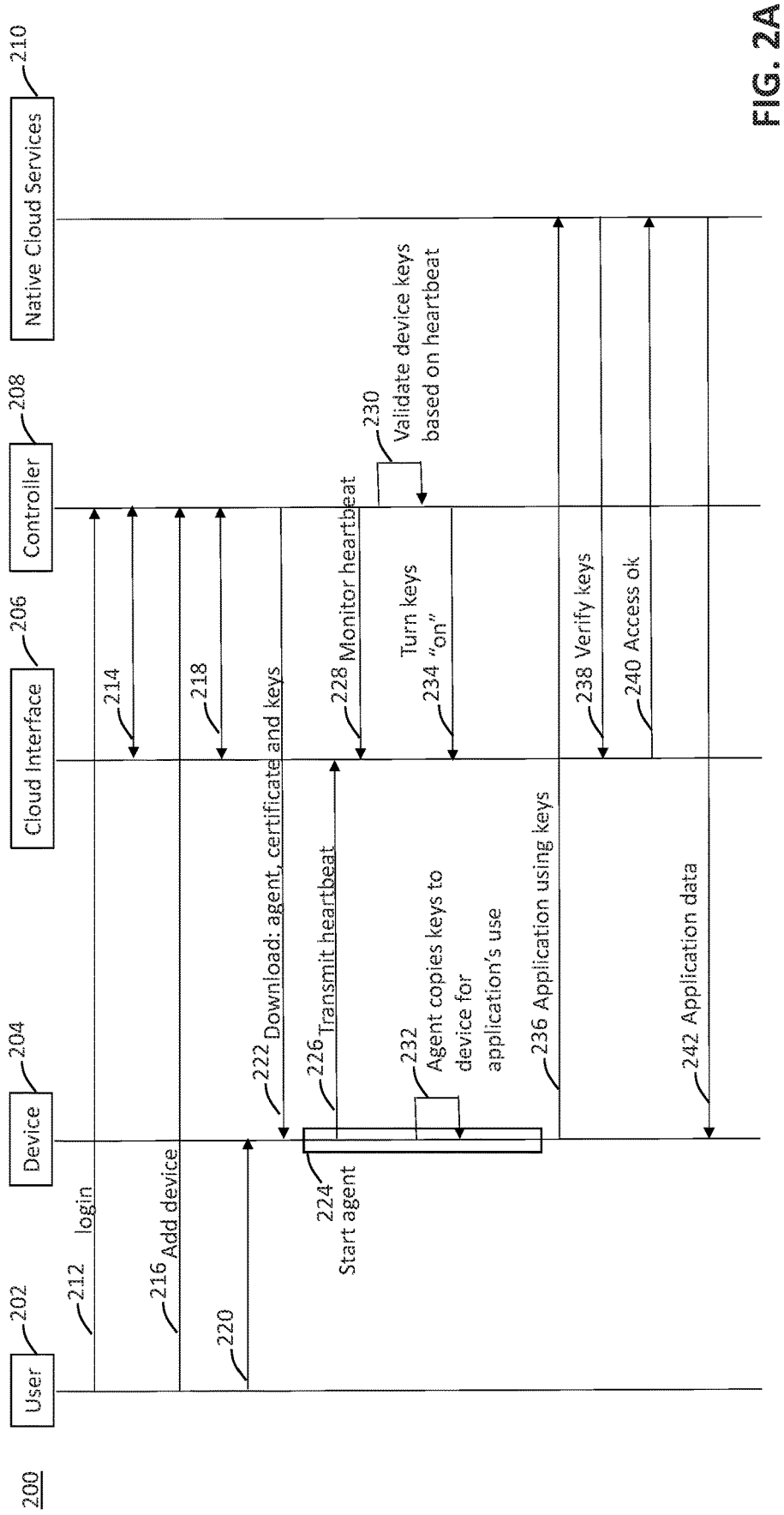

Certain example embodiments described herein relate to systems and techniques that enable computers that are outside of a cloud to be able to efficiently use various cloud-based services while overcoming deficiencies such as, for example, the deficiencies described above in relation to currently available approaches for accessing a cloud infrastructure from computers that are located outside the cloud. Some example embodiments enable applications executing on computers outside of a cloud infrastructure to access to cloud services, such as, but not limited to, native cloud services like S3™, SNS™, SQS™, Kinesis™, and DynamoDB™.

Native cloud services such as, but not limited to, S3™, SNS™, SQS™, Kinesis™, and DynamoDB™, are an example category of services that either cannot be protected or is not desirable to be protected, for example, in AWS environments, by applying IP networking based cloud policies like security group (security groups are described, for example, at https://docs.aws.amazon.com/AWSEC2/latest/UserGuide/using-network-security.html) or VPC (VPC are described, for example, at http://docs.aws.amazon.com/AWSEC2/latest/UserGuide/using-vpc.html). The security for these services is achieved by applying IAM policies (IAM policies are described, for example, at http://docs.aws.amazon.com/IAM/latest/UserGuide/introduction-.html). One goal of some example embodiments is to provide an equivalent of (or similar approach to) IAM Instance profile like security mechanism to secure access to native cloud services from computers outside the cloud. Additionally, ideally, the application code should not require any code to renew keys and the like, but should operate in the same manner (or in a very similar manner) as it were to run on an EC2 instance (EC2 is described, for example, at http://docs.aws.amazon.com/AWSEC2/latest/UserGuide/concepts.html) inside AWS data center, and provide the same (or very similar) level of security.

Certain example embodiments achieve these capabilities by associating a timer to each access key pair created in the cloud. For each client device from outside the cloud that requires access to cloud services, in addition to providing the access key pair, example embodiments provide a certificate. The client device is required to transmit a heartbeat message using the certificate at a predefined regular interval (e.g., every X seconds, where X is a predetermined number typically in tens of seconds). Within the cloud, certain software according to example embodiments monitor the heartbeats for each client device and marks the corresponding access key pair as inactive if the client device misses a predetermined amount of heartbeats. Thus, certain example embodiments do not require changing the value of the key pair over time, but only block and unblock access to the same key pair, thereby enabling the application code to be agnostic of this scheme. An agent software running on the client device copies the key pair in an appropriate directory specified in an AWS specification after which the application code does not need to have any reference to the keys. Thus, certain example embodiments achieve the functionality where the application code does not change, at least from a native cloud service access perspective, whether it is running on the client device (which is outside the cloud) or within a cloud data center.

FIG. 1 illustrates a system 100 for securely accessing native cloud services from outside the cloud, according to some example embodiments. The system 100 includes a cloud infrastructure 104 and at least one client device 108. The client device 108 and the cloud infrastructure 104 may be communicatively connected by the Internet or other communication infrastructure.

The cloud infrastructure 104 may include a plurality of servers (often referred to as "cloud servers") interconnected by the Internet and/or one or more communication infrastructures. The cloud servers, such as, for example, the cloud servers 102, 102', 110 and 130 shown in FIG. 1, may be collocated in one datacenter or may be geographically distributed at several interconnected datacenters. As also noted above, example cloud infrastructures include AWS, Microsoft Azure, Google Cloud Platform and IBM Bluemix, etc.

The cloud infrastructure 104 includes one or more cloud servers 110 that provides services that are often referred to as "native cloud services". Native cloud services are a collection of services that can be utilized by other applications that are run on cloud servers. The native cloud services may include storage services, database services, account administration services, etc. S3, SNS, SQS, Kinesis, DynamoDB, etc. are some example native cloud services available in the AWS cloud infrastructure.

A cloud infrastructure, such as cloud infrastructure 104, may host applications for many clients. For example, a corporation ABC may, instead of purchasing and configuring their own computer servers for running corporate applications such as, for example, an Enterprise Resource Planning (ERP) application, may decide to run their application on AWS as a client of AWS. In the illustrated system 100, application 106 may be an ERP application being run in the cloud infrastructure, on behalf of a particular client or user (e.g., aforementioned corporation ABC). Application 106', which is running on another physical server 102', which is also part of the cloud infrastructure, may be a part of, or a replica of (e.g., for load balancing, reliability, etc.), the example ERP application.

The cloud infrastructure 104 may provide an interface for applications to communicate with cloud-based applications and/or services. Some of the applications that communicate with cloud services, such as, for example, native cloud services 110, may be from within the cloud infrastructure. For example, application 106, which is executing on a cloud server, may utilize native cloud services. In addition, some applications from outside of the cloud infrastructure may also utilize native cloud services. For example, application part 107, running on client device 108, may also utilize native cloud services 110. The cloud API (cloud interface) 130 may provide an interface for cloud-internal applications and cloud-external applications to utilize native cloud services.

The client device 108 may include one or more computers comprising any of personal computers, laptops, handheld computers, smartphones, wearable devices, other server computers, etc., that are external to the cloud infrastructure 108. In some of the example embodiments, a user accesses the client device 108 to perform such tasks as, for example, software code development, code testing, and/or running one or more applications. The user may also require access, via the client device 108, to the cloud infrastructure 104. For example, in some example embodiments, the user may develop an application part 107 that the user wants to run (e.g. execute) on the client device 108, which may require access to some services (e.g., native cloud services) provided in the cloud infrastructure or to communicate with an application running inside the cloud infrastructure (e.g., running on a cloud server).

According to some embodiments, cloud device 108 may also include cloud client software 132. Cloud client software 132 may, for example, provide the capability for application part 107 and/or agent 114 that runs on client device 108, to interact with cloud services through the cloud API 130.

The capability provided in some embodiments for client devices that are outside of the cloud infrastructure to interact with native cloud services and the like, is enabled by an application which can include an application (referred to as a "controller") 112 executed inside the cloud infrastructure, and another application (referred to as an "agent") 114 executed in the external client device 108. The controller 112 communicates with the agent 114 to control the use and authentication of the one or more keys that are used to secure communication from the client device 108 to the cloud infrastructure 104.

According to some embodiments, the controller 112 may enable each client device 108 to operate as a "tenant" 116 within the user's account. For example, whereas the cloud infrastructure runs applications 106, 106' and controller 112 in a particular user (e.g., corporation ABC) account 128, the controller 112 may choose to create a respective tenant 116 for each client device 108.

The controller 112 additionally creates a virtual device 118 corresponding to each client device 108. The controller 112 may also create one or more virtual device policies 120 and/or one or more virtual device rules 122 to control operations associated with the virtual device and, correspondingly, the client device 108 represented by the virtual device 118.

Still further, the controller 112 generates a certificate 124 and one or more keys 126 that are then provided to the client device 108 for use in communication with the cloud infrastructure 104.

The client device 108 utilizes the certificate 124 to secure a heartbeat message 134 transmitted to the cloud infrastructure at regular intervals. The one or more keys are used to protect the communication with native cloud services 110 and the like in the cloud infrastructure. Within the cloud infrastructure, the controller 112 ensures that the use of the keys is safe by monitoring the heartbeat messages and accordingly changing an internally-maintained state of the keys assigned to the client device 108 from active to inactive or vice versa.

System 100 is shown in FIG. 1 with one client device 108. However, embodiments are not limited to any particular number of client devices such as client device 108, nor to any particular number of users (such as users of client devices and/or corporations that subscribe to cloud resources/accounts).

FIGS. 2A and 2B illustrates a flowchart 200 showing processes in the system of FIG. 1 for securely accessing native cloud services from outside the cloud, according to some example embodiments. In some embodiments, the process shown in flowchart 200 may be performed by the client device 108 and one or more of the cloud servers 102, 102', 110 and 130 in cloud infrastructure 104. Although flowchart 200 illustrates operations 212-252 in a particular order, in some example embodiments 212-252 may be performed in an order different from that shown, or may be performed with one or more additional operations or without one or more operations 212-252.

The processes shown in flowchart 200 illustrate some example communication between a client device 204, a cloud interface 206, a controller 208 and native cloud services 210. In some embodiments, client device 204, controller 208, and native cloud services 210 may correspond respectively to client device 108, controller 112, and native cloud services 110. Cloud interface 206 represents the communication infrastructure of the cloud. A user (e.g., a human user or a computer program) 202 may interact with client device 204 to provide input and to receive output that is displayed, stored or otherwise processed.

In the scenario shown in flowchart 200, the client device 204, which is external to a cloud infrastructure that includes cloud interface 206 and native cloud services 210, is provided with the capability to have applications running thereon to utilize cloud-based services such as those provided by native cloud services 210. The client device 204 may be, for example, a computer of a corporation that is a subscriber to the cloud infrastructure. The capability for the client device 204 to utilize native cloud services is provided by the controller 206, which may itself be run in the cloud infrastructure by the corporation as one of its applications. For example, controller 206 may be a portion of an application, which includes a controller portion (e.g., controller 112) that is to be run on a cloud server, and an agent portion (e.g., agent 114) that is intended to be run on the client device that is attempting to utilize native cloud services from outside the cloud infrastructure. For purposes of the following description, at the beginning of the scenario illustrated in FIGS. 2A-B, the controller 206 is already running within corporation ABC's user account in the cloud infrastructure (e.g. controller 112 running in the cloud 104 within user account 128).

The scenario starts by, in operation 212, the user 202 logging in to the controller 208 executing in the cloud infrastructure within a client account. The user may login to the controller by providing user credentials such as a username and password. At operation 214, the controller 208 and cloud interface 206 interact to authenticate user 202. The user's login credentials and the authentication of those credentials may be performed according to conventional techniques.

At operation 216, the user 202 instructs the controller 208 to add a virtual device. The controller may, for example, provide a web-based interface by which the user can provide this instruction. According to some example embodiments, the user may specify a name for the virtual device. In other embodiments, the name for the virtual device may be automatically generated.

At operation 218, the controller 208 interacts with the cloud interface 206 to add the requested virtual device. In some embodiments, adding a virtual device to the cloud infrastructure may correspond to adding an Internet-of-Things (IOT) "thing". The controller may call an interface (e.g. APU 206) to invoke the capabilities provided by the cloud infrastructure to create the virtual device. The addition of the virtual device may, among other processing associated with the creation of the virtual device on the cloud infrastructure, also involve the creation of policies, rules etc. that are necessary for the virtual device to operate within the cloud infrastructure. Additionally, one or more certificates and one or more keys are also generated in association with the newly added virtual device. Controller 208 may create the certificate(s) and key(s) by calling the cloud interface 206. The controller 208 may then provide for the user to download the certificate(s) and key(s) for use on the client device 204. In an embodiment, each client device 204 is provided to download one certificate and one key pair. However, embodiments are not limited to a single certificate and a single key pair per client device. Further details about creation of a virtual device and associated aspects are described in relation to FIGS. 3 and 4.

At operation 220, the user accesses a web browser or the like from client device 204 to download the certificate and a key pair to the client device 204. The user 202 may also download code for an agent (e.g., agent 114) to be run on the client device.

At operation 222, the certificate and key pair are downloaded to the client device 204. Additionally, the agent code is also downloaded if not already available in the client device 204.

At operation 224, the client device 204 start the agent by executing the downloaded agent code. For example, the agent may operate in a manner described in relation to agent 114 in FIG. 1. During its execution, the agent repeatedly transmits heartbeat messages to the cloud infrastructure. Illustrated operation 226 represents transmission of heartbeat messages. The heartbeat messages may be transmitted at a predefined regular interval. The interval may be configured so that the controller 208 as well as the agent executing on the client device 204 are aware of its parameters (e.g., configured number of seconds, and, optionally, the content/format of the heartbeat message). Embodiments are not limited to any particular format of messages.

At operation 228, the controller 208 continually monitors heartbeat messages received from the client device by interacting with the cloud interface 206. The monitoring may be performed by checking a status of a particular file at regular intervals determined based on the heartbeat interval configuration.

Conditions for determining the client device to be active or inactive based on heartbeat messages may be preconfigured at the controller 208. At operation 230, based on the detected pattern of heartbeat messages, the controller determines that the client device is active, and validates the key pair that was generated at the time the virtual device was added.

At operation 234 the controller 208, if the validation at operation 230 is successful, marks the pair of keys as "active" or "on" in the cloud interface 206. The keys may thus be turned on and off (i.e. turned between an active state and an inactive state) based on the heartbeat monitored at operation 228. The marking of the state of the keys may be performed by cloud interface 206 upon being called by the controller 206.

On the client device 204, at operation 232, the agent copies the downloaded keys to the client device storage so that an application running on the client device can use the keys. For example, the agent may copy the key pair from its memory to a directory on the client device where the application (e.g., application 107) is programmed or configured to obtain keys from.

At operation 236, an application (e.g., application 107) running on the client device accesses the keys copied to the device by the agent, and uses one or more of the keys to secure its communication with the cloud infrastructure. For example, requests for native cloud services 210 may be secured using the keys.

At operations 238 and 240 the native cloud services 210 and the cloud interface 206 interact to verify the key used in securing the communication as valid. In the illustrated scenario, since the keys are currently marked by the controller as active or on, the cloud interface 206 determines that the keys are valid and accordingly authenticates the communication from the client device 204.

At operation 242, after having verified that the communication from the client device as valid, the native cloud service 210 may provide the client device 204 with a response to its request. The native cloud services 210 may secure the communication using one of the keys of the key pair. According to an embodiment, the key pair comprises a public key and a private key pair generated in accordance with a public key infrastructure. The communications from the client device may be secured with its private key and the communications to it are secured using its public key.

The application running on the client device may continue to utilize cloud services such as the services provided by the native cloud services 210 in this manner, thereby enabling the user to run an application or part of an application that utilizes cloud services, transparently from a device that is external to the cloud infrastructure.

In the illustrated scenario, for example, at some point in time, upon monitoring the heartbeat at operation 244, the controller 208 determines that the monitored heartbeat no longer complies with the predefined pattern. Thus, at operation 246, the controller 208 determined that the client device is no longer authenticated, and, at operation 248, sets the keys to "inactive" or "off" by communicating with the cloud interface.

Subsequently, in some embodiments starting immediately upon the keys being marked inactive/off at the request of the controller, the cloud interface 206 may act to prevent authentication of any further communications from the client device 204. Accordingly, when at operation 236, the application on the client device continues to communicate with the native cloud services 210, and the native cloud services attempts to validate the keys at operation 250, the cloud interface 206 rejects the validation at operation 252.

As a consequence, the native cloud services 210 can refrain from acting any further upon the request from the client device. Optionally, the native cloud services 210 may return a notification to the client device 204 indicating that the authentication has failed and/or that the request will not be services.

FIG. 3 is a flowchart of a process 300 performed by a controller in the cloud for securely accessing native cloud services from outside the cloud, according to some example embodiments. In an example embodiment, process 300 may be performed by one or more of a controller 112, application 106, application 106', cloud API 130, native cloud services 110, or other cloud server. For clarity of description, the following description is based on the process being performed by the controller 112. Although process 300 includes operations 302-310, in some example embodiments, 302-310 may be performed in an order different from that shown, or may be performed with one or more additional operations or without one or more operations 302-310.

After entering process 300, at operation 302, the user is logged in. Each client device (such as client device 204 and/or 108) may be provided with a set of credentials to access one or more accounts (e.g., in the controller such as controller 208 or controller 112). The controller, as described above, is running in a cloud account (e.g., an AWS account) from where the native cloud services are being accessed. The account in the controller is often referred to as tenant (e.g. tenant 116). Each account can be accessed by multiple users (e.g. such as user 202).

At operation 304, upon receiving a request from the logged in user, a virtual device is added. For example, after a user such as user 202 logs into the controller 208, the user operates in the desired account and adds a new virtual device (e.g., virtual device 118) in this account. In some embodiments, the user may accomplish the addition of a new virtual device by merely specifying a "name" for a new virtual device. The controller may append the account name to the device name. For example, if the account name is "duploservices-account1" and the user specified device name is "foo", then the controller may store the device name as "duploservices-account1-foo". In embodiments, the "name" of a virtual device corresponds to the full name formed above that includes the account name. Some of the processing performed when adding a virtual device is described below in relation to process 400.

At operation 306, agent code, a certificate and a key pair may be prepared for download to the client device. In some embodiments, the agent code may not be required to be downloaded to the client device. The creation of the certificate and key pair are described in relation to process 400.

At operation 308, monitoring of heartbeat messages is initiated by the controller. As described below, the agent (e.g. agent 114) executing on the client device uses the certificate provided to the client device at operation 306 to publish a heartbeat message. According to some embodiments, the communication between the client device and the cloud infrastructure for transmitting the heartbeat message may use a protocol defined by the cloud infrastructure. For example, the agent 114 may transmit a heartbeat message by constructing a message according to a particular format and providing the message to the cloud API 130. In some embodiments, a heartbeat message may be sent to a service (e.g., the AWS IOT controller) where the publish topic is <devicename>/hb (e.g. "duploservices-account1-foo/hb". This may in turn create or overwrite a file in the cloud such as "duploservices-account1-foo/hb" in S3 storage.

The controller actively monitors the last modified time stamp for all files by the name <devicename>/hb where there may be one <devicename> for each virtual device added to the controller by any user. The monitoring may be performed based on a timer. By monitoring the timestamp the controller detects when was the last heartbeat performed.

At operation 310, the keys are activated or deactivated based on the status of the heartbeat. For example, if the last modified is within the last X seconds (where X may be configured by the owner of the AWS account, i.e. system admin of the corporation owner of the AWS account) then the controller can mark the key or key pair active. If not the key or key pair is marked inactive.

Operations 308 and 310 may be repeated at regular intervals, to continuously monitor the client devices connectivity to the cloud and the associated validity of the key pair assigned to the client device.

FIG. 4 is a flowchart of another process 400 performed by or under the control of the controller of FIG. 3 for providing secure access to native cloud services from outside the cloud, in accordance with some example embodiments. In an example embodiment, process 400 may be performed by one or more of a cloud API 130, native cloud services 110, or other cloud server. For clarity of description, the following description is based on the process being performed by the cloud interface 130 at the direction of the controller 112. Although process 400 includes operations 402-410, in some example embodiments, 402-410 may be performed in an order different from that shown, or may be performed with one or more additional operations or without one or more operations 402-410. According to an embodiment, process 400 may be executed when performing operation 304. Thus, process 400 may be initiated upon a request made by a controller, such as controller 112, upon receiving a request to add a virtual device to the cloud.

After entering process 400, at operation 402, a virtual device is created in response to a user request as described in relation to operation 304, and an associated certificate and key pair are generated. According to an embodiment, the controller (e.g. controller 112) adds the following constructs in AWS IOT service for each virtual device (e.g. virtual device 118) added to the cloud infrastructure in operation 304: (A) a unique AWS IOT certificate (example certificate are described at http://docs.aws.amazon.com/iot/latest/developerguide/create-device-certificate.html) is created; (B) a unique AWS IOT thing (IOT "things" are described, for example, at http://docs.aws.amazon.com/iot/latest/developerguide/register-device.html) is created; and (C) a unique AWS IOT policy (example IOT policies are described at http://docs.aws.amazon.com/iot/latest/developerguide/create-iot-policy.html) is created. The name of the created "thing" is the name of the virtual device as described above.

At operation 404, a policy is configured specifying how the communication between the created virtual device and external devices is to be controlled. In some example embodiments, an AWS IOT policy may be created which specifies that any device which has the certificate can only publish and subscribe to AWS IOT topics (IOT topics are described, for example, at http://docs.aws.amazon.com/iot/latest/developerguide/topics.html) that start with the device name (e.g. "duploservices-account1-foo"). This mechanism enables control of which devices can publish a messages to which topic.

At operation 406, one or more rules are created so that the cloud infrastructure is configured to notify the controller when messages are received for the created virtual device. According to an embodiment, the controller may create a rule in the AWS IOT rules engine (an example IOT rules engine is described, for example, at http://docs.aws.amazon.com/iot/latest/developerguide/iot-rules-tutorial.html) specifying that for every message received on a certain topic, to create a corresponding file in the AWS S3 storage. For example if a device publishes a message to "duploservices-account1-foo/hb", then a file names "duploservices-account1-foo/hb" can be created in S3 storage. This S3 storage (or at least the created file) may be configured to be accessible only by the controller and not by client devices or users.

At operation 408, a user identity is created for the virtual device. According to an embodiment, the controller creates, for every client device, an IAM user with an access key pair and marks it inactive.

At operation 410, the certificate and the pair of keys are made available for download to the client device. According to an embodiment, the controller makes the certificate and the private key pair available for download to the user from the web interface from where the user had logged in to the user's account. After the certificate and key pair have been generated, the user can download the certificate and the key pair and, optionally, the agent code (e.g. for agent 114) to be executed on the client device.

Figure 5:
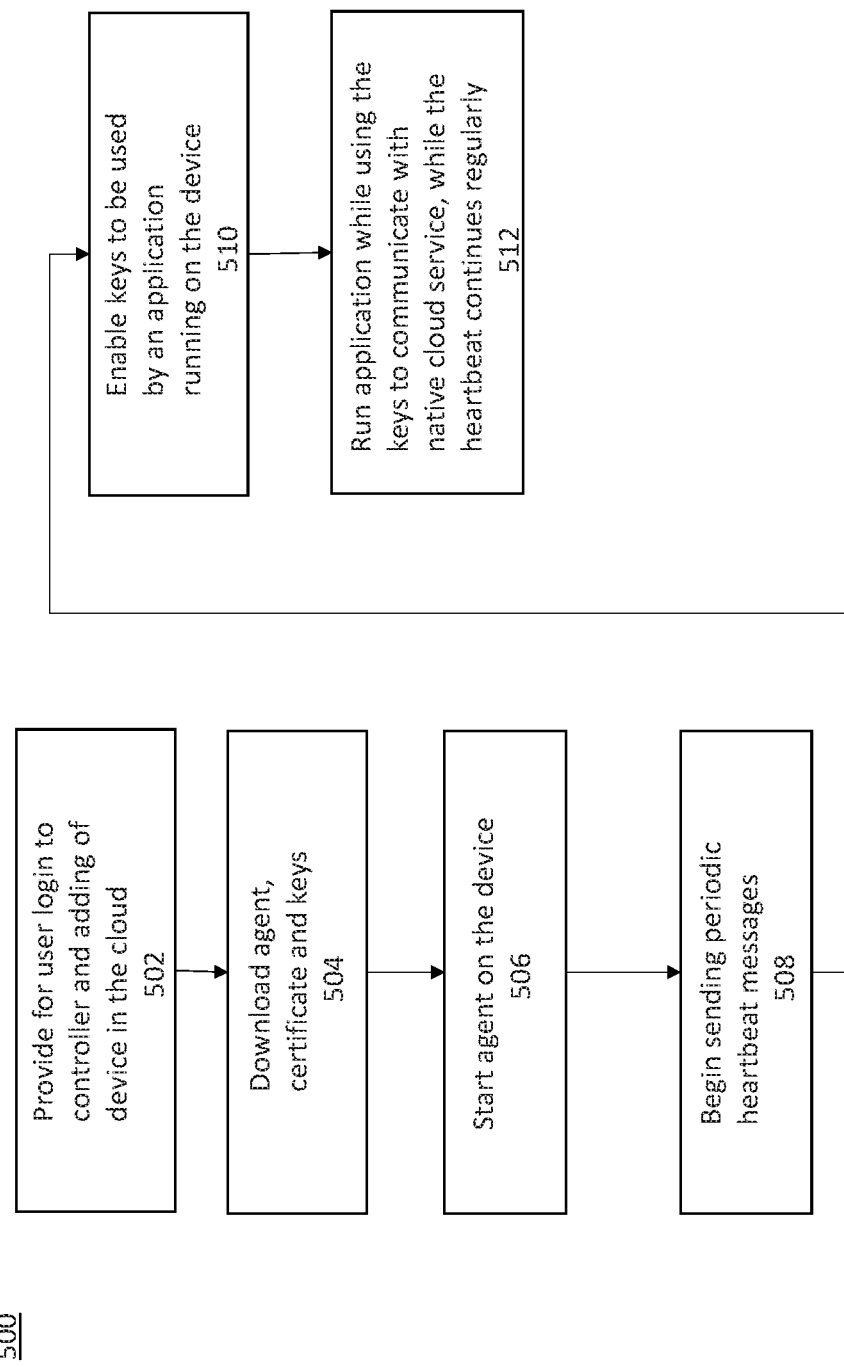
FIG. 5 is a flowchart of a process performed on a client device outside the cloud for securely accessing native cloud services, in accordance with certain example embodiments.

FIG. 5 is a flowchart of a process 500 performed on a client device outside the cloud for securely accessing native cloud services, in accordance with certain example embodiments. In an example embodiment, process 500 may be performed by the client device 108. Although process 500 includes operations 502-512, in some example embodiments, 502-512 may be performed in an order different from that shown, or may be performed with one or more additional operations or without one or more operations 502-512.

After entering process 500, at operation 502, the client device may provide for user login to a cloud infrastructure (e.g., by logging in to the controller) and/or adding a virtual device to the cloud infrastructure.

At operation 504, a certificate, a pair of keys, and optionally, an agent code, are downloaded to the client device. The certificate itself can be secured by saving it in the computer Operating System's secure certificate store from which it cannot be stolen. Further we can protect the certificate with hard device attached to computer commonly called a Yubi Key (Yubi Key is described, for example, at https://www.wired.com/story/how-to-use-a-yubikey/). Securing certificates in computers through these mechanisms are well established and accepted security practices.

At operation 506, the downloaded agent code is executed on the client device. According to an embodiment, inside the client device 108, the agent 114 is started which will use the certificate to publish a heartbeat message to the AWS IOT controller where the publish topic is <devicename>/hb (e.g. "duploservices-account1-foo/hb").

At operation 508, the transmission of periodic heartbeat messages is initiated. As described above, the agent (e.g. agent 114) executing on the client device 108 uses the certificate received at operation 504 to publish the heartbeat messages. According to some embodiments, the communication between the client device and the cloud infrastructure for transmitting the heartbeat message may use a protocol defined by the cloud infrastructure. For example, the agent 114 may transmit a heartbeat message by constructing a message according to a particular format and providing the message to the cloud API 130. In some embodiments, a heartbeat message may be sent to a service (e.g., the AWS IOT controller) where the publish topic is <devicename>/hb (e.g. "duploservices-account1-foo/hb".

At operation 510, the agent code may enable the downloaded keys to be used by one or more other applications running on the client device in order to secure communications with the cloud infrastructure. According to an embodiment, the agent 114 running on the client device 108 copies the key pair in to a directory specified by AWS (AWS configurations are described, for example, at https://boto3.readthedocs.io/en/latest/guide/quickstart.html) so that any application code (e.g., application 107) running on the client device can access native cloud services without any explicit reference to the keys in the code. In this manner, example embodiments make the application code (e.g. application 107 code) portable across client devices (such as client device 108) and cloud servers (e.g. AWS datacenter EC2 instances).

At operation 512, one or more applications are run on the client device 108, where the applications use one or more of the downloaded keys to secure its communication with the cloud infrastructure.

Thus, example embodiments provide mechanism to maintain the access key pair active or inactive based on a heartbeat from a client device that is external to the cloud infrastructure. Further, only devices with the correct certificate can publish the heartbeat. Moreover, the client device can publish only to the topic that starts with the name of that device to which the certificate belongs. With these techniques, example embodiments provide a mechanism to protect access to native cloud services (e.g., native AWS cloud services) by marking the access key pairs active/inactive based on device heartbeats which in turn are protected by a certificate. Consequently, embodiments enable functionality that was previously not available for users to efficiently and securely access native cloud services and the like from outside of a cloud infrastructure. These newly enabled efficient and secure capabilities can be used in various scenarios including, but not limited to, developers developing or testing application code on computers outside the cloud infrastructure, and transitioning of an organization from one cloud infrastructure to another (e.g. private cloud based organizations to a public cloud).

FIG. 6 illustrates a computing platform 600 such as that may be utilized by client device 108 and/or any computer corresponding to cloud servers 102, 102', 110 or 130, to execute any of processes 200, 300, 400 and 500. According to some embodiments, the computer platform 600 includes a processor 604, a communicating infrastructure 605 connecting the components of the computer, a memory 606, a network interface 608, and I/O interfaces 610.

Processor 604 may include one processor or more than one interconnected processors. According to some embodiments, processor 604 may execute on or more of the processes 200, 300, 400 and 500.

The memory 606 may be configured to store databases associated with applications 106 and 107. Memory 606 may also be used for storing configuration information, certificates, keys etc.

Network interface(s) 608 are utilized by processor 604 to locations outside the local device, such as from the client device to the cloud infrastructure, from the cloud infrastructure to the client device, or among different servers in the cloud infrastructure.

I/O interface(s) 610 enables user of the provide configuration information and control information via one or more of a keyboard, touchscreen, voice to text translation etc. I/O interface 610 also enables delivery of the results of the processing performed by the processor to a screen or display.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted herein as tables, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Processors, memory, network interfaces, I/O interfaces, and displays noted above are, or includes, hardware devices (for example, electronic circuits or combinations of circuits) that are configured to perform various different functions for a computing device, such as computer 600.

In some embodiments, each or any of the processors 604 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 604 uses an instruction set architecture such as x86 or Advanced RISC Machine (ARM).

In some embodiments, each or any of the memory devices 106 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 604). Memory devices 606 are examples of non-volatile computer-readable storage media.

In some embodiments, each or any of the network interface devices 108 includes one or more circuits (such as a baseband processor and/or a wired or wireless transceiver), and implements layer one, layer two, and/or higher layers for one or more wired communications technologies (such as Ethernet (IEEE 802.3) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces in IO interfaces 610 is or includes one or more circuits that receive data from the processors 104, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device, which displays the image data. Alternatively or additionally, in some embodiments, each or any of the display interfaces is or includes, for example, a video card, video adapter, or graphics processing unit (GPU).

In some embodiments, each or any of the user input adapters in I/O interfaces 110 is or includes one or more circuits that receive and process user input data from one or more user input devices that are included in, attached to, or otherwise in communication with the computing device 602, and that output data based on the received input data to the processors 604. Alternatively or additionally, in some embodiments each or any of the user input adapters is or includes, for example, a PS/2 interface, a USB interface, a touchscreen controller, or the like; and/or the user input adapters facilitates input from user input devices such as, for example, a keyboard, mouse, trackpad, touchscreen, etc.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

As used herein, the term "non-transitory computer-readable storage medium" includes a register, a cache memory, a ROM, a semiconductor memory device (such as a DRAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of securing access to a service in a cloud infrastructure from a client device outside of the cloud infrastructure, the method comprising:
   in response to a user request received from the client device, creating, in a memory of the cloud infrastructure, a virtual device corresponding to the client device;
   associating at least a certificate, a key, a policy and a predetermined pattern of heartbeat messages with the virtual device in the memory;
   providing the certificate and the key to the client device;
   monitoring heartbeat messages received from the client device, each heartbeat message including the certificate and being in accordance with the policy associated with the virtual device;
   changing a recorded status of the key in accordance with a correspondence of the monitored heartbeat messages to the predetermined pattern; and
   in response to messages received from a first application and a second application on the client device, controlling access by the first application and the second application to the service in accordance with the recorded status of the key.

2. The method according to claim 1, wherein the programming code of the first application and the programming code of the second application are devoid of references to the key.

3. The method according to claim 2, further comprising running the first application within the cloud infrastructure.

4. The method according to claim 1, wherein the controlling access by the first application and the second application to the service in accordance with the recorded status of the key comprises enabling said access if the recorded status is a first status and preventing said access if the recorded status is a second status.

5. The method according to claim 1, wherein the changing a recorded status of the key in accordance with a correspondence of the monitored heartbeat messages to the predetermined pattern comprises setting the recorded status to a first status when the monitored heartbeat messages correspond to the predetermined pattern and setting the recorded status to a second status when the monitored heartbeat messages does not correspond to the predetermined pattern.

6. The method according to claim 1, further comprising providing for the heartbeat messages to be published to a predetermined topic associated with the client device, wherein the policy specified one or more devices including the client device as permitted to publish to the predetermined topic.

7. The method according to claim 1, wherein the monitoring further comprises validating the heartbeat messages based on the certificate.

8. The method according to claim 1, wherein the key comprises a public key and a private key.

9. The method according to claim 1, wherein the access provides for the first application running on the client device to interact with a third application running in the cloud infrastructure.

10. The method according to claim 9, wherein the third application includes a native cloud service provided by the cloud infrastructure.

11. The method according to claim 1, wherein monitoring heartbeat messages includes periodically checking, by a controller application running in the cloud infrastructure and in a user account, a file being updated by the cloud infrastructure upon receipt of respective messages from the client device.

12. The method according to claim 11, wherein the file is updated by the cloud infrastructure upon receipt of respective messages received from the client device according to a standard application programming interface provided by the cloud infrastructure.

13. The method according to claim 1, further comprising:
configuring at least one rule associated with the added virtual device,
wherein the configured rule causes the cloud infrastructure to write to a predetermined storage area upon receiving respective messages from the client device, and wherein a controller application running in the cloud infrastructure and in a user account performs the monitoring based on the writing to said the predetermined storage area.

14. A system comprising:
a server in a cloud infrastructure, wherein the server is configured to perform operations comprising:
in response to a user request received from the client device, creating, in a memory of the cloud infrastructure, a virtual device corresponding to the client device;
associating at least a certificate, a key, a policy and a predetermined pattern of heartbeat messages with the virtual device in the memory;
providing the certificate and the key to the client device;
monitoring heartbeat messages received from the client device, each heartbeat message including the certificate and being in accordance with the policy associated with the virtual device;
changing a recorded status of the key in accordance with a correspondence of the monitored heartbeat messages to the predetermined pattern; and
in response to messages received from a first application and a second application on the client device, controlling access by the first application and the second application to the service in accordance with the recorded status of the key.

15. A non-transitory computer readable storage medium storing computer programming instructions that, when executed by at least one processor of a server in a cloud infrastructure, causes the server to provide, to a client device outside of the cloud infrastructure, secure access to a service in the cloud infrastructure, by performing operations comprising:
in response to a user request received from the client device, creating, in a memory of the cloud infrastructure, a virtual device corresponding to the client device;
associating at least a certificate, a key, a policy and a predetermined pattern of heartbeat messages with the virtual device in the memory;
providing the certificate and the key to the client device;
monitoring heartbeat messages received from the client device, each heartbeat message including the certificate and being in accordance with the policy associated with the virtual device;
changing a recorded status of the key in accordance with a correspondence of the monitored heartbeat messages to the predetermined pattern; and
in response to messages received from a first application and a second application on the client device, controlling access by the first application and the second application to the service in accordance with the recorded status of the key.

* * * * *